United States Patent
Chu

(10) Patent No.: US 9,904,812 B2
(45) Date of Patent: Feb. 27, 2018

(54) METHOD OF PROTECTING POWER RECEIVER AND RELATED WIRELESS CHARGING DEVICE

(71) Applicant: HTC Corporation, Taoyuan (TW)

(72) Inventor: Feng-Seng Chu, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 15/335,437

(22) Filed: Oct. 27, 2016

(65) Prior Publication Data
US 2017/0046541 A1 Feb. 16, 2017

Related U.S. Application Data

(62) Division of application No. 14/188,656, filed on Feb. 24, 2014, now Pat. No. 9,507,969.
(Continued)

(51) Int. Cl.
*G06F 21/88* (2013.01)
*H02J 50/10* (2016.01)
(Continued)

(52) U.S. Cl.
CPC .............. *G06F 21/88* (2013.01); *G06F 21/81* (2013.01); *G07F 15/006* (2013.01); *G07F 15/10* (2013.01); *H02J 5/005* (2013.01); *H02J 7/0027* (2013.01); *H02J 7/025* (2013.01); *H02J 7/027* (2013.01); *H02J 50/10* (2016.02); *H02J 50/80* (2016.02); *H02J 50/90* (2016.02); *G06Q 2220/12* (2013.01); *H02J 2007/0001* (2013.01)

(58) Field of Classification Search
CPC .......... G06F 21/88; G06F 21/81; H02J 50/80; H02J 50/90; H02J 50/10; H02J 5/005; H02J 7/0027; H02J 7/025; G07F 15/10; H02L 7/027
USPC ...................................... 726/34–36
See application file for complete search history.

(56) References Cited

U.S. PATENT DOCUMENTS

| | | | |
|---|---|---|---|
| 5,530,431 | A | 6/1996 | Wingard |
| 5,945,809 | A | 8/1999 | Inaba |

(Continued)

FOREIGN PATENT DOCUMENTS

| | | |
|---|---|---|
| CN | 102005108 A | 4/2011 |
| DE | 102006029427 A1 | 1/2008 |

(Continued)

OTHER PUBLICATIONS

Wireless Power Consortium, System Description, Wireless Power Transfer, vol. 1: Low Power Part 1: Interface definition v1.1.1, Jul. 2012.
(Continued)

*Primary Examiner* — Shanto M Abedin
(74) *Attorney, Agent, or Firm* — Winston Hsu

(57) ABSTRACT

A method for a power receiver for protecting a power receiver from being taken without permission while charged wirelessly includes receiving wireless power from a power transmitter and performing wireless charging in a security mode by the power receiver; detecting whether the wireless charging is interrupted without receiving a security code for authorization; and starting a protection function if the power receiver detects that the wireless charging is interrupted without receiving the security code for authorization.

6 Claims, 11 Drawing Sheets

Related U.S. Application Data

(60) Provisional application No. 61/834,890, filed on Jun. 14, 2013, provisional application No. 61/768,373, filed on Feb. 22, 2013.

(51) Int. Cl.
*H02J 50/90* (2016.01)
*G06F 21/81* (2013.01)
*G07F 15/10* (2006.01)
*H02J 5/00* (2016.01)
*H02J 7/00* (2006.01)
*H02J 7/02* (2016.01)
*G07F 15/00* (2006.01)
*H02J 50/80* (2016.01)

(56) References Cited

U.S. PATENT DOCUMENTS

| | | | |
|---|---|---|---|
| 6,111,504 A | 8/2000 | Packard | |
| 6,609,207 B1* | 8/2003 | Cromer | G06F 21/31 710/301 |
| 6,718,381 B1 | 4/2004 | Herzi | |
| 8,103,391 B2* | 1/2012 | Ferro | B60L 11/1824 701/1 |
| 2002/0082059 A1 | 6/2002 | Nariai | |
| 2003/0014660 A1 | 1/2003 | Verplaetse | |
| 2004/0203601 A1 | 10/2004 | Morriss | |
| 2005/0104555 A1 | 5/2005 | Simmonds-Short | |
| 2005/0242918 A1 | 11/2005 | Van Dongen | |
| 2007/0072474 A1* | 3/2007 | Beasley | H02J 7/0042 439/332 |
| 2007/0138999 A1 | 6/2007 | Lee | |
| 2007/0279002 A1 | 12/2007 | Partovi | |
| 2008/0141069 A1 | 6/2008 | Iwamura | |
| 2008/0184355 A1* | 7/2008 | Walrath | G06F 21/35 726/9 |
| 2009/0128346 A1* | 5/2009 | Zhao | G08B 21/24 340/636.15 |
| 2010/0066507 A1 | 3/2010 | Myllymaki | |
| 2011/0050447 A1* | 3/2011 | Tedesco | G08B 13/1427 340/687 |
| 2011/0076986 A1 | 3/2011 | Glendinning | |
| 2011/0235565 A1 | 9/2011 | Wu | |
| 2012/0050040 A1 | 3/2012 | Melvin | |
| 2012/0111589 A1 | 5/2012 | Schmidt | |
| 2012/0129577 A1 | 5/2012 | Vaknin | |
| 2012/0150670 A1 | 6/2012 | Taylor | |
| 2012/0173418 A1* | 7/2012 | Beardsmore | G06Q 30/06 705/40 |
| 2012/0176249 A1 | 7/2012 | Chatterjee | |
| 2012/0248891 A1 | 10/2012 | Drennen | |
| 2013/0030608 A1 | 1/2013 | Taylor | |
| 2013/0257168 A1 | 10/2013 | Singh | |
| 2013/0335020 A1* | 12/2013 | Moore | H02J 7/025 320/109 |
| 2014/0306657 A1* | 10/2014 | Lundgren | H02J 7/025 320/108 |
| 2014/0312836 A1* | 10/2014 | Lundgren | H02J 7/025 320/108 |

FOREIGN PATENT DOCUMENTS

| | | |
|---|---|---|
| EP | 2620889 A1 | 7/2013 |
| GB | 2320397 A | 6/1998 |
| GB | 2394843 A | 5/2004 |
| JP | 2011041409 | 2/2011 |

OTHER PUBLICATIONS

European patent application No. 14020018.9, European Search Report dated May 2, 2014.

\* cited by examiner

METHOD OF PROTECTING POWER RECEIVER AND RELATED WIRELESS CHARGING DEVICE

CROSS REFERENCE TO RELATED APPLICATIONS

This is a divisional application of application Ser. No. 14/188,656, which claims the benefit of U.S. Provisional Application No. 61/768,373, and U.S. Provisional Application No. 61/834,890, the contents of which are included in its entirety herein by reference.

BACKGROUND OF THE INVENTION

1. Field of the Invention

The present invention relates to a method used in a wireless charging system and related wireless charging device, and more particularly, to a method of improving the security of the power receiver in a wireless charging system and related wireless charging device.

2. Description of the Prior Art

With the proliferation of portable electronic devices such as smart phone and tablet PC, the demand for charging devices, especially for those provided in public areas, is increasing. In addition, people would like to get rid of annoying wires if possible. One technology which realizes this desire is wireless charging, in which mobile device(s) (i.e. power receiver) is placed on and charged through a charging device (i.e. power transmitter). Therefore, the current trend is towards providing wireless charging in public areas so that people can easily find a wireless power supply to charge their portable electronic devices.

Wireless Power Consortium (WPC) is a leading organization in the world to define wireless charging specification. The document Wireless Power Transfer—Volume I, part I in version 1.1.1 released in July 2012 has specified the communication protocol between a power transmitter and a power receiver. In section 5.3.3, it defines that the power receiver shall transmit the following sequence of packets:
1. An Identification Packet, which includes an identity of the power receiver if the power receiver enters an identification and configuration phase from the ping phase.
2. An Extended Identification Packet, if the Ext bit of the preceding Identification Packet is set to ONE.
3. Up to 7 Optional Configuration Packets.
4. A Configuration Packet, where the second byte (B1) and the fifth byte (B4) of the Configuration Packet are reserved bytes, and the 4 bits (b6-b3) in the third byte (B2) are reserved bits.

On the other hand, the specification defines that the power receiver shall transmit zero or more of the Control Error Packet, the Received Power Packet, the Charge Status Packet, the End Power Transfer Packet, and Any Proprietary Packet. If the power transmitter does not know how to handle the message contained in the Proprietary Packet, the power transmitter shall ignore that message.

Furthermore, the specification defines that at any time a user can remove a Mobile Device that is receiving power. The power transmitter can recognize such an event from a time-out in the communications from the power receiver or from a violation of the Power Transfer Contract. In addition, the power receiver may stop transmitting packets to the power transmitter at any time.

From the above description, the specification defines that the Identification Packet is sent from Power Receiver to the power transmitter only once at the identification and configuration phase, and it supports to remove the power receiver at any time. But how the power transmitter knows the power receiver is removed by the owner or by the others is not sure. As people place their mobile devices on a power transmitter, they may not always keep an eye on them. In such a situation, the mobile devices might be taken away by other people without permission.

Therefore, how to secure the power receiver while the power receiver performs wireless charging publicly is a topic to be addressed and discussed in the industry.

SUMMARY OF THE INVENTION

An objective of the present invention is to provide a method and related wireless charging system capable of protecting the power receiver from being taken without permission.

The present invention discloses a method for a power receiver for protecting the power receiver from being taken without permission while charged wirelessly includes receiving wireless power from a power transmitter and performing wireless charging in a security mode by the power receiver; detecting whether the wireless charging is interrupted without receiving a security code for authorization; and starting a protection function if the power receiver detects that the wireless charging is interrupted without receiving the security code for authorization.

The present invention further discloses a power receiver, which includes a processing means, for executing a program; and a storage unit, coupled to the processing means, for storing the program which instructs the processing means to perform the following steps, for protecting the power receiver from being taken without permission while charged wirelessly: receiving wireless power from a power transmitter and performing wireless charging in a security mode; detecting whether the wireless charging is interrupted without receiving a security code for authorization; and starting a protection function if the wireless charging is detected to be interrupted without receiving the security code for authorization.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
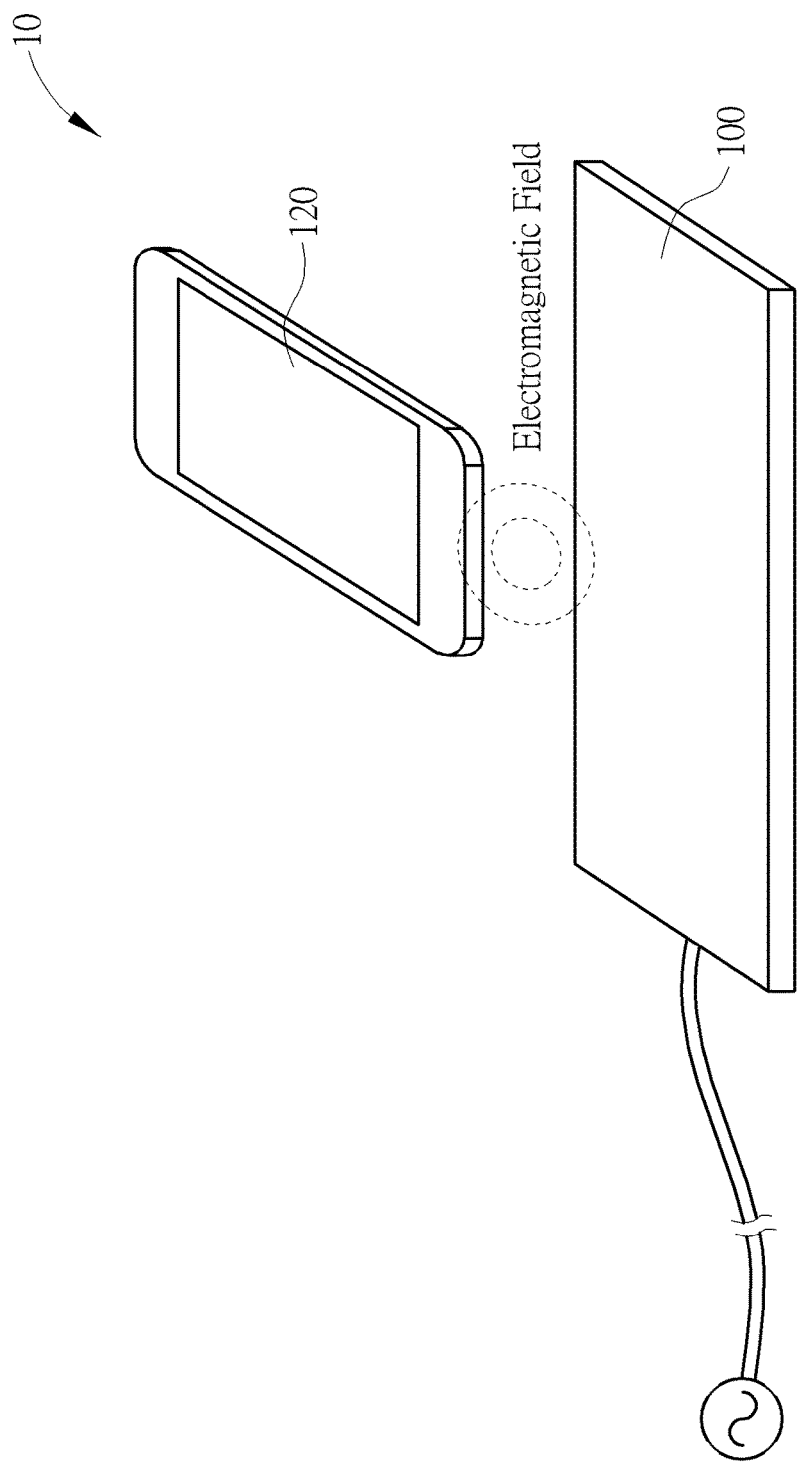
FIG. 1 is a schematic diagram of a wireless charging system according to an example of the present invention.

Please refer to FIG. 1, which illustrates a schematic diagram of a wireless charging system 10 according to an example of the present disclosure. A wireless charging system may include at least one power transmitter and at least one power receiver. For simplicity, in FIG. 1, the wireless charging system 10 is briefly composed of a power transmitter 100 and a power receiver 120. The power transmitter may represent a power base station, or a power transmitting module including digital/analog chip(s), to supply wireless power. The power receiver may be a mobile phone, a laptop, a tablet computer, an electronic book, a portable computer system, any other mobile devices or at least a power receiving module. Alternatively, the power receiver 120 may be any electronic device using battery as its power supply, such as a wearable computing device, a wearable medical device, a portable MP3 player, etc. The power receiver 120 may directly attach to the power transmitter 100 or keep within a distance from the power transmitter 100 for wireless charging. As shown in FIG. 1, the power receiver 120 receives wireless power from the power transmitter 100 by electromagnetic induction, so as to charge the battery of the power receiver 120 without using any wire connection.

Figure 2:
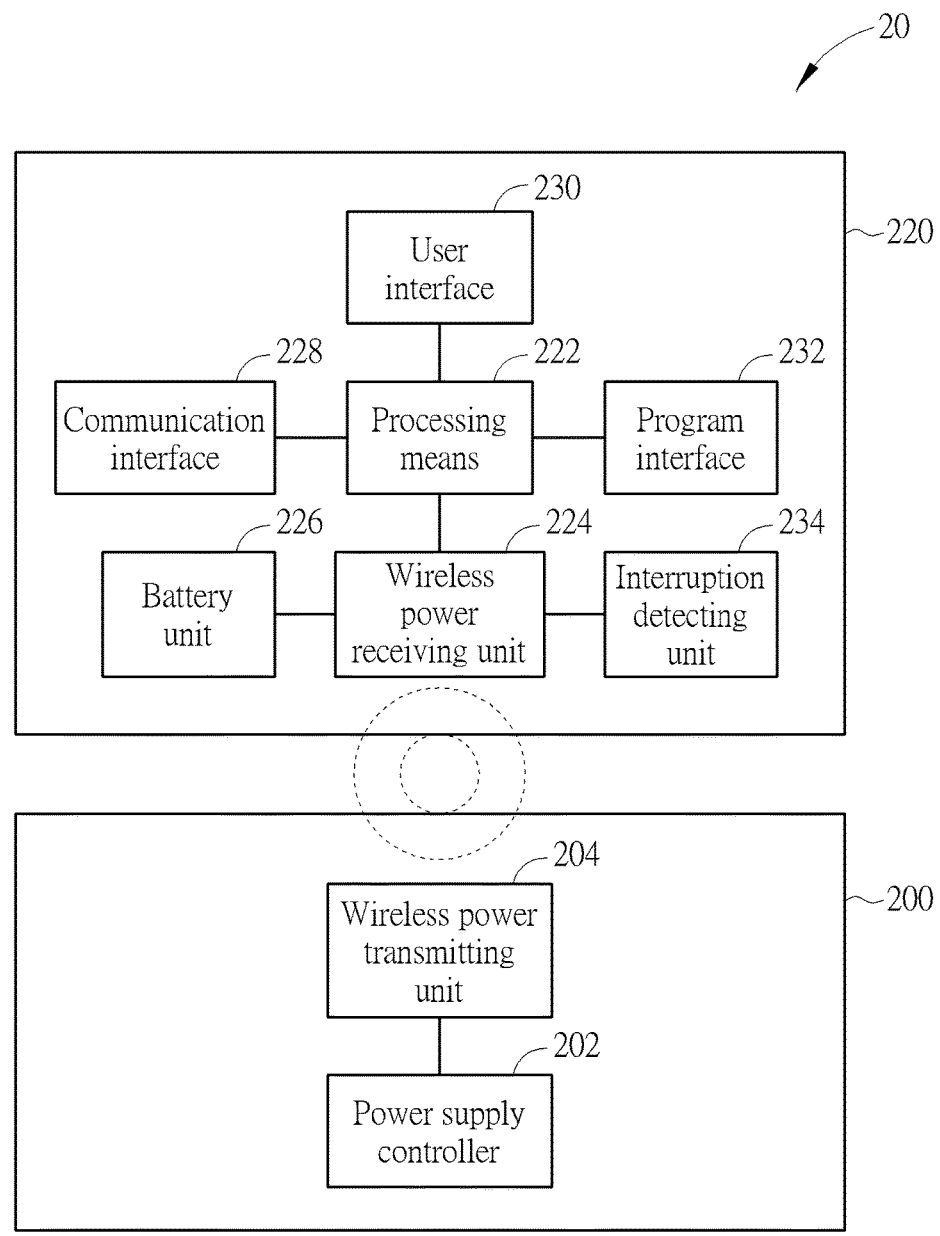
FIG. 2 is a schematic diagram of a wireless charging system according to an example of the present invention.

Please refer to FIG. 2, which is a schematic diagram of a wireless charging system 20 according to an example of the present invention. The wireless charging system 20 includes a power transmitter 200 and a power receiver 220. The power transmitter 200 may be the power transmitter 100 shown in FIG. 1, and the power receiver 220 may be the power receiver 120 shown in FIG. 1. The power transmitter 200 may include a power supply controller 202 and a wireless power transmitting unit 204. The power supply controller 202, such as a microcontroller or an Application Specific Integrated Circuit (ASIC), generally handles signals transmitted/received from the power receiver 200, so as to control the wireless power transmitted by the wireless power transmitting unit 204. The power receiver 220 may include a processing means 222 such as a microprocessor or an ASIC, a wireless power receiving unit 224, a battery unit 226, a communication interface 228, a user interface 230, a program interface 232, and an interruption detecting unit 234. The wireless power receiving unit 224 receives the wireless power from the power transmitter 200 to charge the battery unit 226. The communication interface 228 is preferably a radio transceiver that transmits and receives radio signals (e.g., messages, emails, or packets) according to processing results of the processing means 222. In addition, the communication channel between the power transmitter 200 and the power receiver 220 may be an in-band communication channel (e.g. by using load modulation), in which communication signals are carried by the wireless power. Alternatively, the communication channel between the power transmitter 200 and the power receiver 220 may be an out-band communication channel (e.g. by using a short-range communication protocol such as Bluetooth). The user interface 230 may include a touch panel, keyboard, button, microphone, camera, fingerprint identity sensor, a gesture sensor, or any interface that can receive user inputs. The program interface 232 may be an application program interface, which receives a command or a control signal from the processing means 222 to launch a function or control an application provided by the power receiver 220. The interruption detecting unit 234 may be coupled to the power receiving unit 224 for real-time detecting whether the wireless power received by the power receiving unit 224 is interrupted.

Figure 3:
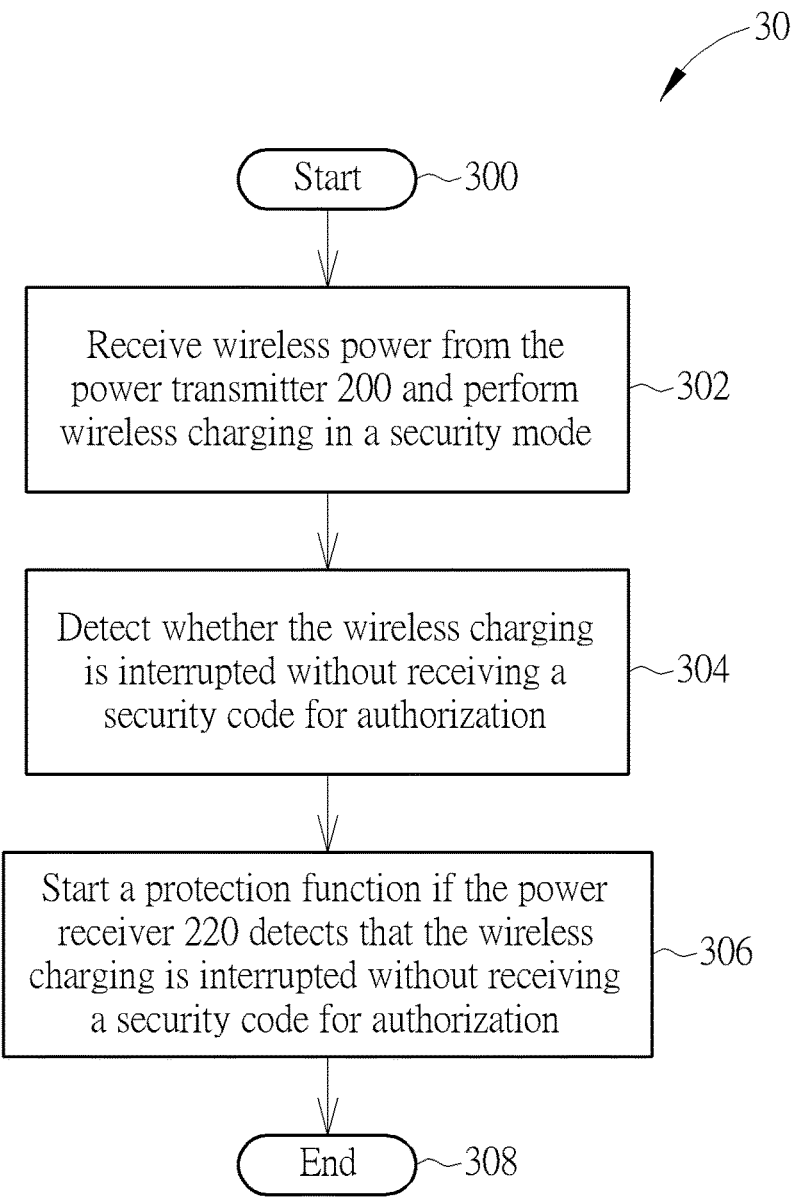
FIG. 3 is a flowchart of a process according to an example of the present invention.

Please refer to FIG. 3, which is a flowchart of a process 30 according to an example of the present invention. The process 30 is utilized for a wireless charging system, such as the wireless charging system 20 shown in FIG. 2, to protect a power receiver from being taken without permission while charged wirelessly and thus improve the security of the power receiver. The power receiver could be the power receiver 220 in the wireless charging system 20, but is not limited herein. The process 30 may be implemented by the power receiver 220 and compiled into a program code to instruct the processing means 222 to execute the following steps:

Step 300: Start.

Step 302: Receive wireless power from the power transmitter 200 and perform wireless charging in a security mode.

Step 304: Detect whether the wireless charging is interrupted without receiving a security code for authorization.

Step 306: Start a protection function if the power receiver 220 detects that the wireless charging is interrupted without receiving a security code for authorization.

Step 308: End.

According to the process 30, an owner of the power receiver 220 may configure the power receiver 220 to perform wireless charging in the security mode. The owner may define a specific contour or drawing, a snapshot, a series of numbers and/or alphabets and/or symbols, a voice message including specific words or sentences, a gesture, a fingerprint, an image of a human face or a part of the body, or any of their combinations as the security code of the security mode. When the power receiving unit 224 performs wireless charging, the interruption detecting unit 234 continuously detects whether the wireless power is interrupted (i.e. the power receiver 220 is removed from the power transmission coverage of the power transmitter 200) and generates a detection result for the processing means 222. If the detection result indicates that the wireless charging is interrupted but a user input matching with the security code has not been received within a certain period (e.g. 5 seconds), the processing means 222 determines that an unauthorized interruption occurs and the power receiver 220 might be stolen. In response, the power receiver 200 may start the protection function as an action to protect the power receiver 220 from being taken without permission. For example, the protection function may be a function for releasing a warning signal to notify an owner of a power receiver theft. The warning signal may be in a form of a beep, a noisy sound, video, audio, image, and/or a bright light which is activated via the program interface 232 to draw the owner's attention. As a result, the present invention can prevent the charging receiver 220 from being taken without permission in a public space.

Note that the process 30 is an example of the present invention. Those skilled in the art should readily make combinations, modifications and/or alterations on the abovementioned description and examples. For example, after the unauthorized interruption is detected, the power receiver 220 may also launch a function or an application for reporting a location of the power receiver 220 through the program interface 232. In this way, the owner may track the lost power receiver 220 and manage to find it easily. In addition, another function or application may automatically send a loss notification to a specific person and/or a place for help. The example of the loss notification may be a message or an email sent via the communication interface 228. The example of the specific person and/or the place may be the owner of the power receiver 220, an owner who provided the power transmitter 200 such as a coffee shop or an airport, the front desk of the coffee shop, or a police station nearby.

Figure 4:
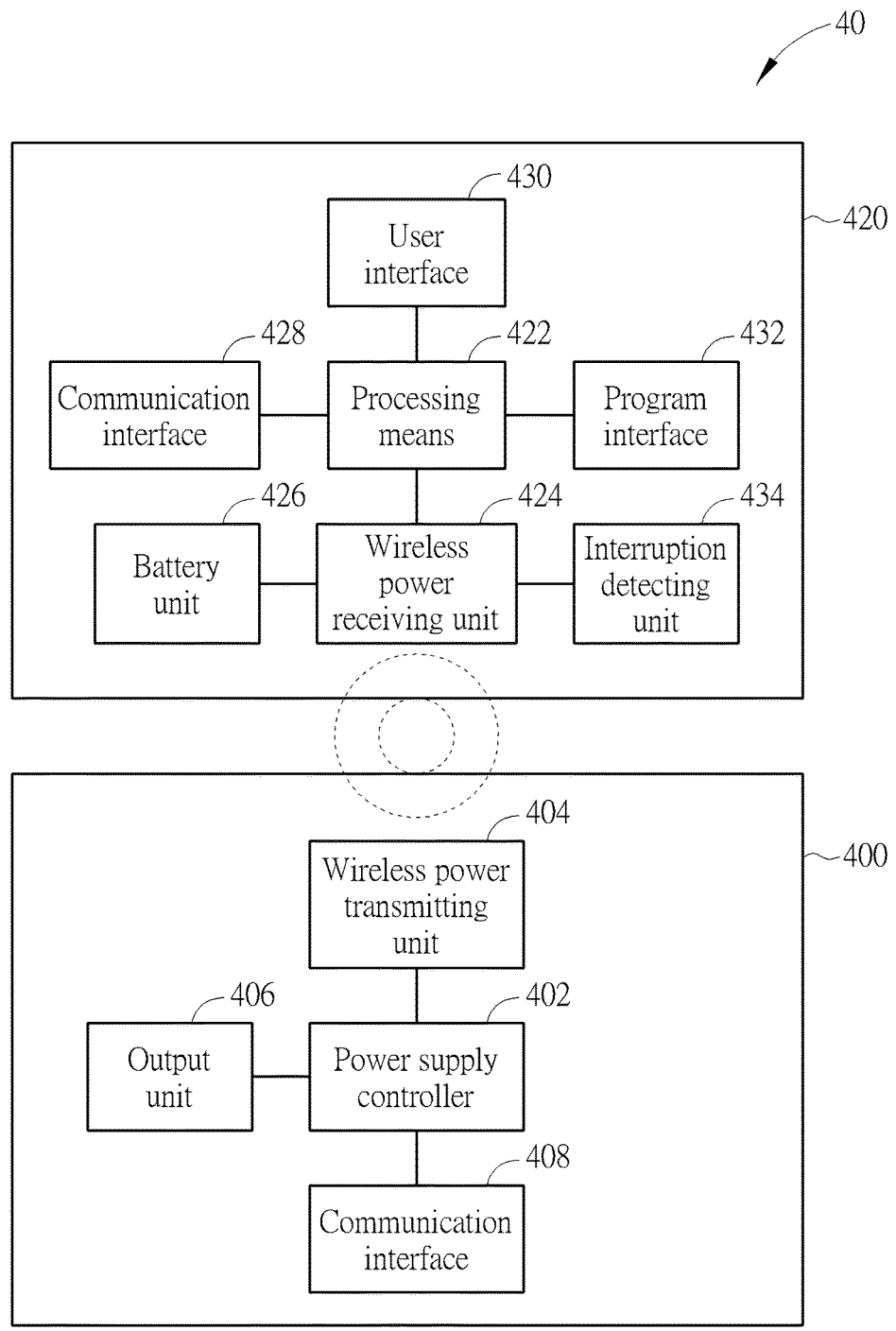
FIG. 4 is a schematic diagram of a wireless charging system according to an example of the present invention.

In another example, the power transmitter may have the capability to warn the owner about the power receiver theft as well. Please refer to FIG. 4, which is a schematic diagram of a wireless charging system 40 according to an example of the present invention. The wireless charging system 40 includes a power transmitter 400 and a power receiver 420. Comparing to the wireless charging system 20 shown in FIG. 2, the power transmitter 400 may additionally include an output unit 406 and/or a communication interface 408. The output unit 406 may include a speaker, a light-emitted diode (LED), a screen, or a vibrator. The communication interface 408 may be a radio transceiver that can transmit and receive radio signals (e.g., messages, emails, or packets) according to a control signal of the power supply controller 402.

Figure 5A:
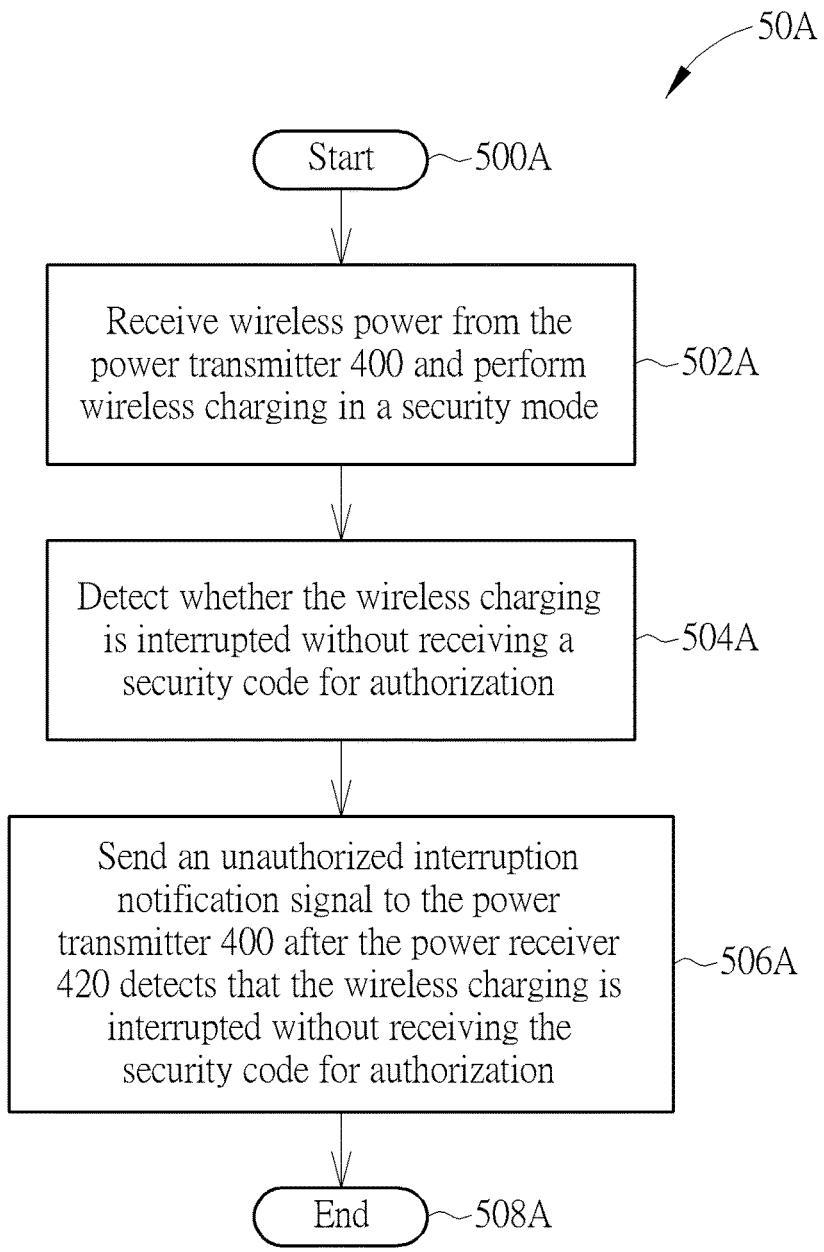
FIG. 5A is a flowchart of a process according to an example of the present invention.

Please refer to FIG. 5A, which is a flowchart of a process 50A according to an example of the present invention. The process 50A is utilized for a wireless charging system, such as the wireless charging system 40 shown in FIG. 4, to protect a power receiver from being taken without permission while charged wirelessly and thus improve the security of the power receiver. The power receiver could be the power receiver 420 in the wireless charging system 40, but is not limited herein. The process 50A may be implemented by the power receiver 420 and compiled into a program code to instruct the processing means 422 to execute the following steps:

Step 500A: Start.
Step 502A: Receive wireless power from the power transmitter 400 and perform wireless charging in a security mode.
Step 504A: Detect whether the wireless charging is interrupted without receiving a security code for authorization.
Step 506A: Send an unauthorized interruption notification signal to the power transmitter 400 after the power receiver 420 detects that the wireless charging is interrupted without receiving the security code for authorization.
Step 508A: End.

Figure 5B:
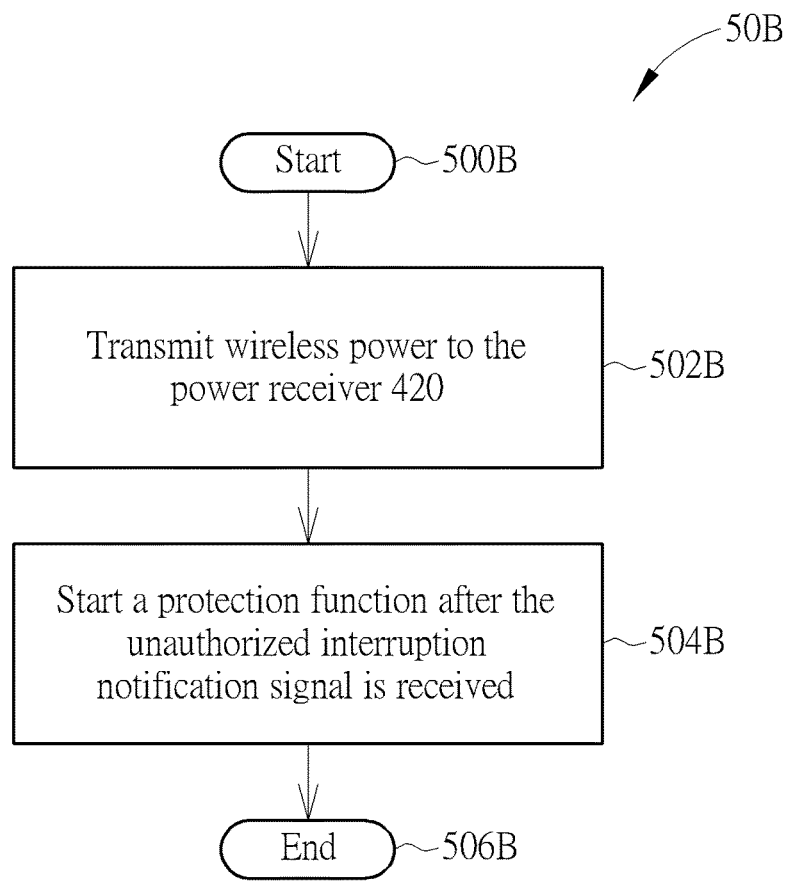
FIG. 5B is a flowchart of a process according to an example of the present invention.

Please refer to FIG. 5B, which is a flowchart of a process 50B according to an example of the present invention. The process 50B is the corresponding actions of the process 50A for the power transmitter 400. The process 50B may be implemented by the power supply controller 402 of the power transmitter 400 to execute the following steps:

Step 500B: Start.
Step 502B: Transmit wireless power to the power receiver 420.
Step 504B: Start a protection function after the unauthorized interruption notification signal is received.
Step 506B: End.

According to the processes 50A and 50B, an owner of the power receiver 420 may configure the power receiver 420 to perform wireless charging in the security mode. The owner may define a specific contour or drawing, a snapshot, a series of numbers and/or alphabets and/or symbols, a voice message including specific words or sentences, a gesture, a fingerprint, an image of a human face or a part of the body, or any of their combinations as the security code of the security mode. When the power receiving unit 424 performs wireless charging, the interruption detecting unit 434 continuously detects whether the wireless power is interrupted (i.e. the power receiver 420 is removed from the power transmission coverage of the power transmitter 400) and generates a detection result for the processing means 422. If the detection result indicates that the wireless charging is interrupted but a user input matching with the security code has not been received within a certain period (e.g. 5 seconds), the processing means 222 may send an unauthorized interruption notification signal to the power transmitter 400. In such a situation, the power transmitter 400, or both the power transmitter 400 and the power receiver 420, can determine that an unauthorized interruption occurs and the power receiver 420 might be stolen, thereby starting the protection function such as releasing a warning signal in a form of a beep, a noisy sound, video, audio, image, and/or a bright light to draw the owner's attention.

In addition, the power receiver 420 may also launch a function or an application for reporting a location of the power receiver 420 for searching the lost power receiver 420. Furthermore, the power transmitter 400 and/or the power receiver 420 may send a loss notification (e.g. a message or an email) to a specific person (e.g. the owner of the power receiver 420, an owner or the front desk of a place where the power transmitter 400 is provided such as a coffee shop, a train station, a restaurant or an airport) and/or a place (e.g. a police station nearby) for help via the communication interface 408/428.

Figure 6:
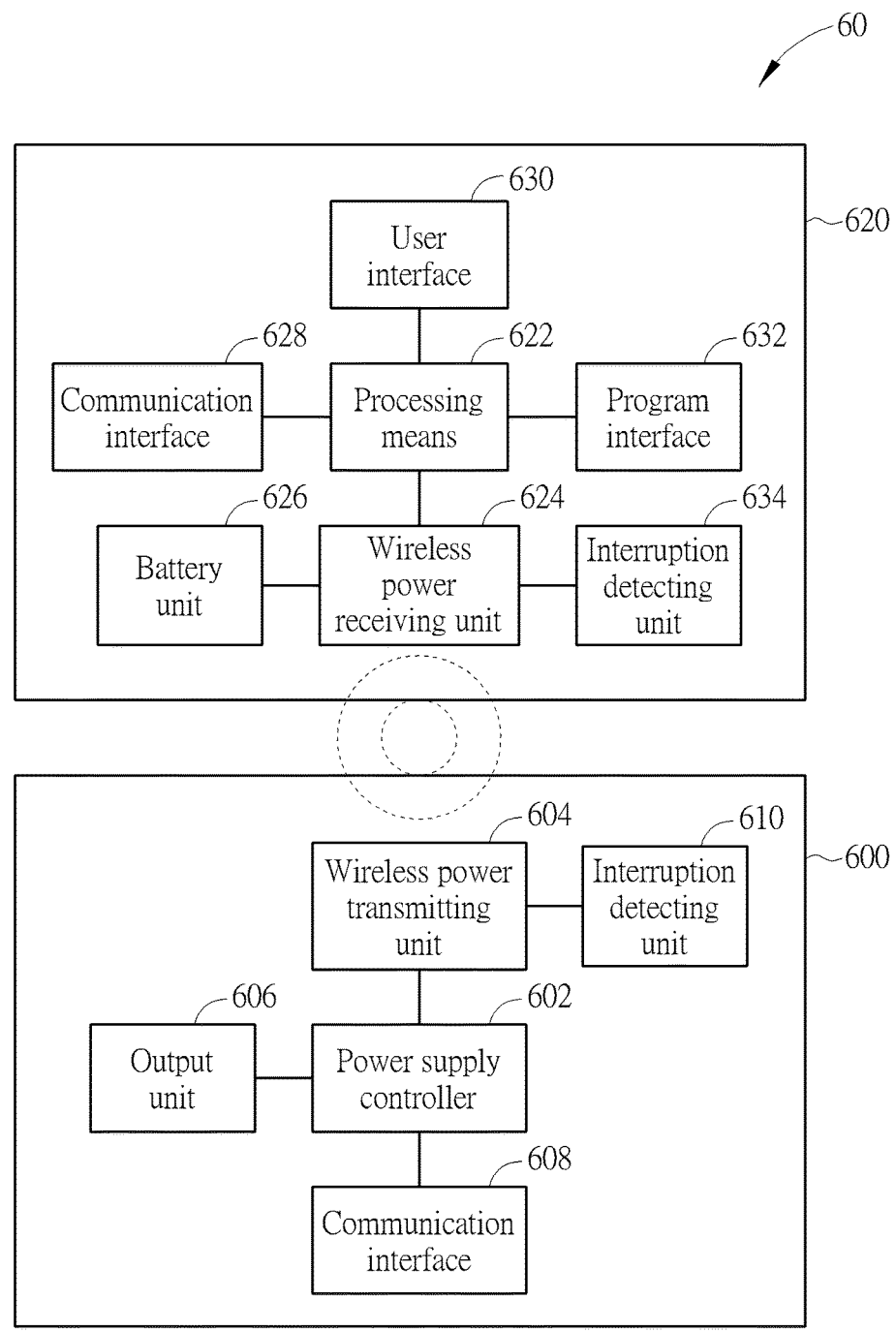
FIG. 6 is a schematic diagram of a wireless charging system according to an example of the present invention.

In another example, the unauthorized interruption is detected by a power transmitter. Please refer to FIG. 6, which is a schematic diagram of a wireless charging system 60 according to an example of the present invention. The wireless charging system 60 includes a power transmitter 600 and a power receiver 620. Comparing to the wireless charging system 40 shown in FIG. 4, the power transmitter 600 additionally includes an interruption detecting unit 610 and the power receiver 620 is not necessarily to include an interruption detecting unit. In this example, the power transmitter 600 may transmit wireless power to the power receiver 620 for wireless charging, and constantly detect whether the wireless charging is interrupted. If the power transmitter 600 detects that the wireless charging is interrupted, it start may a protection function so as to protect the power receiver 220 from being taken without permission.

Figure 7A:
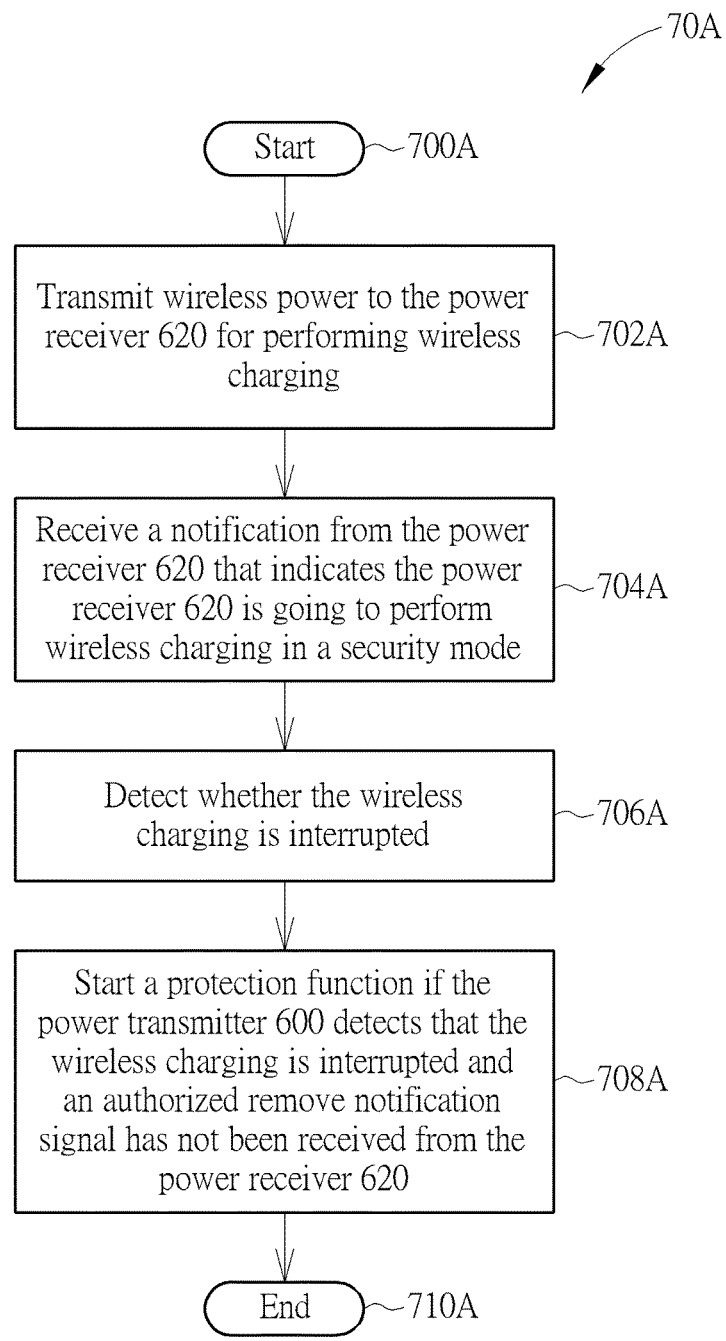
FIG. 7A is a flowchart of a process according to an example of the present invention.

Please refer to FIG. 7A, which is a flowchart of a process 70A according to an example of the present invention. The process 70A is utilized for a wireless charging system, such as the wireless charging system 60 shown in FIG. 6, to protect a power receiver from being taken without permission while charged wirelessly and thus improve the security of the power receiver. The power receiver could be the power receiver 620 in the wireless charging system 60, but is not limited herein. The process 70A may be implemented by the power supply controller 602 of the power transmitter 600 to execute the following steps:

Step 700A: Start.
Step 702A: Transmit wireless power to the power receiver 620 for performing wireless charging.
Step 704A: Receive a notification from the power receiver 620 that indicates the power receiver 620 is going to perform wireless charging in a security mode.
Step 706A: Detect whether the wireless charging is interrupted.
Step 708A: Start a protection function if the power transmitter 600 detects that the wireless charging is interrupted and an authorized remove notification signal has not been received from the power receiver 620.
Step 710A: End.

Figure 7B:
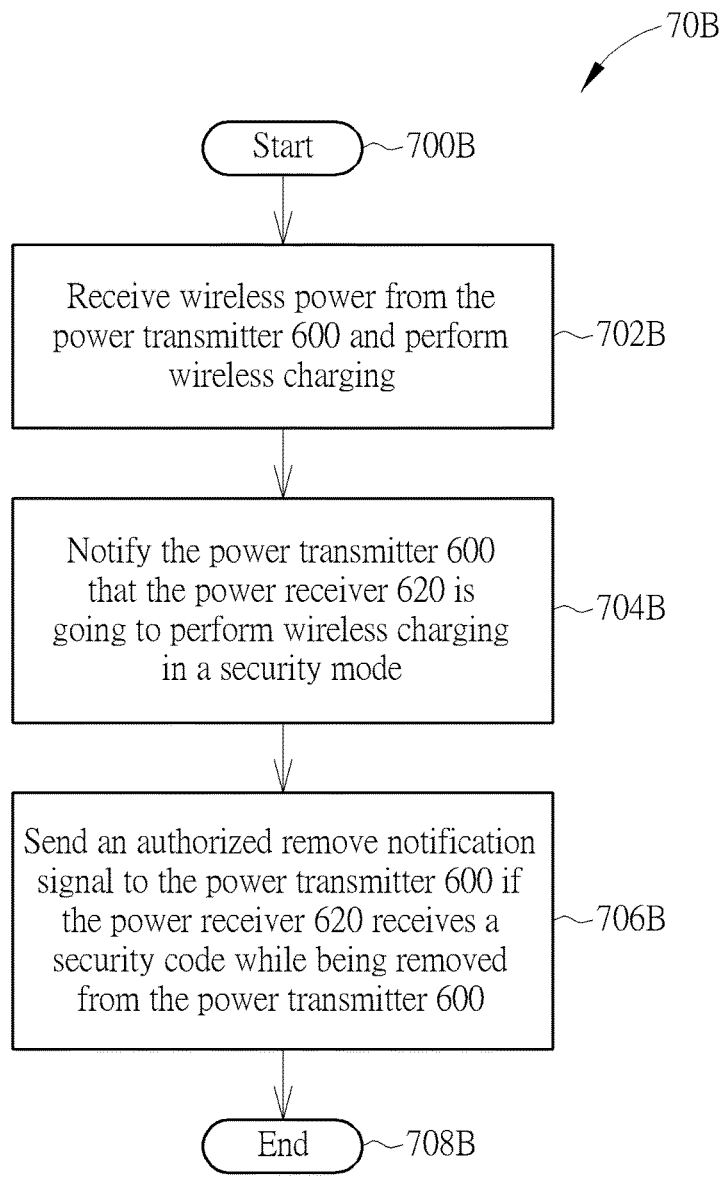
FIG. 7B is a flowchart of a process according to an example of the present invention.

Please refer to FIG. 7B, which is a flowchart of a process 70B according to an example of the present invention. The process 70B is the corresponding actions of the process 70A for the power receiver 620. The process 70B may be implemented by the power receiver 620 and compiled into a program code to instruct the processing means 622 to execute the following steps:

Step 700B: Start.

Step 702B: Receive wireless power from the power transmitter 600 and perform wireless charging.

Step 704B: Notify the power transmitter 600 that the power receiver 620 is going to perform wireless charging in a security mode.

Step 706B: Send an authorized remove notification signal to the power transmitter 600 if the power receiver 620 receives a security code while being removed from the power transmitter 600.

Step 708B: End.

According to the processes 70A and 70B, an owner of the power receiver 620 may configure the power receiver 620 to perform wireless charging in the security mode. The owner may define a specific contour or drawing, a snapshot, a series of numbers and/or alphabets and/or symbols, a voice message including specific words or sentences, a gesture, a fingerprint, an image of a human face or a part of the body, or their combination as the security code of the security mode. During performing wireless charging, the power receiver 620 may notify the power transmitter 600 that the power receiver 620 is going to perform the wireless charging in the security mode. When the wireless power transmitting unit 604 transmits wireless power, the interruption detecting unit 610 constantly detects whether the wireless power is interrupted (i.e. the power receiver 620 is removed from the power transmission coverage of the power transmitter 600) and generates a detection result for power supply controller 602. On the other hand, when the owner of the power receiver 620 intends to terminate the wireless charging, the owner enters the security code to unlock the security mode. Accordingly, the power receiver 620 may send an authorized remove notification signal to the power transmitter 600. If the detection result indicates that the wireless charging is interrupted and the power transmitter 600 receives the authorized remove notification signal, the power supply controller 602 determines that the power receiver 620 is removed with permission. Otherwise, if the detection result indicates that the wireless charging is interrupted but the power transmitter 600 has not receive the authorized remove notification signal from the power receiver 620 within a certain period (e.g. 4 seconds), the power supply controller 602 determines that the unauthorized interruption occurs. In such a situation, the power transmitter 400 may determine that the power receiver 620 might be stolen, and therefore, start a protection function such as releasing the warning signal to draw the owner's attention and/or sending a loss notification (e.g. a message or an email) to a specific person to find help.

In an example, the power receiver 620 may constantly send a feedback to the power transmitter 600. Accordingly, the power transmitter 600 may detect that the wireless charging is interrupted if not receiving the feedback for more than a specific time. The feedback may be sent periodically or non-periodically. The feedback may be included in a control error packet (CEP) for sending to the power transmitter 600 during wireless charging.

Figure 8:
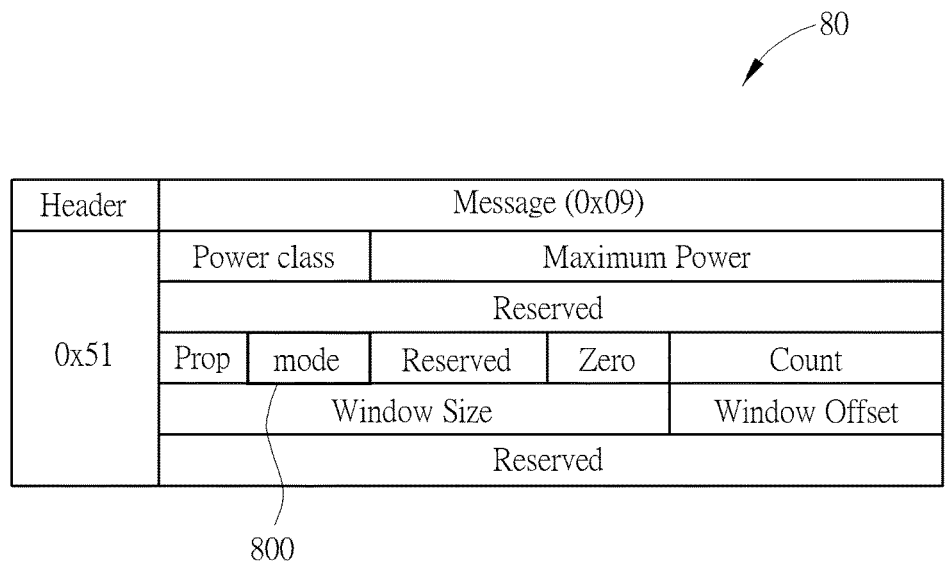
FIG. 8 is a schematic diagram of a configuration packet according to an example of the present invention.

In an example, the power receiver 620 may notify the power transmitter 600 that the power receiver 620 is going to perform the wireless charging in the security mode by a bit included in a configuration packet, during an identification and configuration phase which is a period for initializing the wireless charging. FIG. 8 illustrates a schematic diagram for a configuration packet 80 according to an example of the present invention. As shown in FIG. 8, the configuration packet 80 includes a bit 800 which notifies the power transmitter 600 that the power receiver 620 is going to perform the wireless charging in the security mode.

Figure 9:
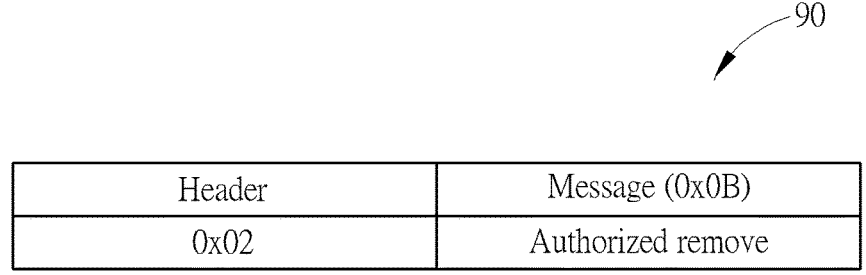
FIG. 9 is a schematic diagram of an end power transfer packet according to an example of the present invention.

The authorized remove notification signal may be realized by an end power transfer packet with a message code indicating that the power receiver 620 is removed with authorization. FIG. 9 illustrates a schematic diagram for an end power transfer packet 90 according to an example of the present invention. As shown in FIG. 9, the end power transfer packet 90 is defined with a specific message code (e.g., 0x0B or else) to indicate that the power receiver 620 is removed with authorization.

In another example, the owner of the power receiver 620 may set the power receiver 620 on the power transmitter 600 before configuring the power receiver 620 to perform wireless charging in the security mode. Under this condition, the configuration packet 80 may have been sent to the power transmitter 600 already, so the power receiver 620 may send an end power transfer packet with a message code indicating 'Re-configure' and then send the configuration packet 80 for notifying the power transmitter 600 that the security mode is going to used.

If the owner takes the power receiver 620 away from the power transmitter 600 without entering the security code of the security mode and thus induces the protection functions (e.g. releasing the warning signal, sending a loss notification, or reporting the location of the power receiver 620) of the wireless charging system 60, the owner can replace the power receiver 620 on the power transmitter 600. In such a situation, the power receiver 620 may send an identification packet to the power transmitter 600. If the power transmitter 600 finds that the identity if the replaced power receiver 620 is consistent with the previous one before the interruption, it may stop the protection functions.

In another example, the power transmitter 600 may send an unauthorized interruption notification signal to the power receiver 620 after detecting the unauthorized interruption. Therefore, the power receiver 620, or both the power transmitter 600 and the power receiver 620, may determine that the power receiver 620 might be stolen, thereby activating the protection functions (e.g. releasing a warning signal to notify an owner of a power receiver theft, launching a function for reporting a location of the power receiver, and/or sending a message to a specific person or a place for help).

The abovementioned steps of the processes 30, 50A, 50B, 70A, and 70B including suggested steps may be realized by means of hardware, software, firmware, or an electronic system. Examples of hardware may include analog, digital and mixed circuits known as microcircuit, microchip, or silicon chip. Examples of the electronic system may include a system on chip (SOC), system in package (SiP), and a computer on module (COM).

To sum up, the present invention provides a security mode (i.e. in addition to a normal charging mode) for charging in a public space. After the unauthorized interruption of the wireless charging is detected, the protection functions such as releasing the warning signal, sending a loss notification, and functions to track the power receiver are activated, thus preventing the power receiver from being stolen.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for a power receiver for protecting the power receiver from being taken without permission while charged wirelessly, the method comprising:
   constantly receiving wireless power and a feedback from a power transmitter and performing wireless charging in a security mode by the power receiver, wherein the feedback is included in a control error packet (CEP) for sending to the power transmitter during wireless charging, and the feedback is sent periodically or non-periodically;
   detecting whether the wireless charging is interrupted without receiving a security code for authorization;
   sending an unauthorized interruption notification signal to the power transmitter after detecting that the wireless charging is interrupted without receiving the security code for authorization; and
   starting a protection function if the power receiver detects that the wireless charging is interrupted without receiving the security code for authorization.

2. The method of claim 1, wherein the protection function comprises at least one of releasing a warning signal to notify an owner of a power receiver theft, launching a function for reporting a location of the power receiver, and sending a message to a specific person or a place for help.

3. The method of claim 1, wherein the power transmitter releases a warning signal to notify an owner of a power receiver theft or sends a message to a specific person or a place for help after receiving the unauthorized interruption notification signal.

4. A power receiver, comprising:
   a processing means, for executing a program; and
   a storage unit, coupled to the processing means, for storing the program which instructs the processing means to perform the following steps, for protecting the power receiver from being taken without permission while charged wirelessly:
   constantly receiving wireless power and a feedback from a power transmitter and performing wireless charging in a security mode, wherein the feedback is included in a control error packet (CEP) for sending to the power transmitter during wireless charging, and the feedback is sent periodically or non-periodically;
   detecting whether the wireless charging is interrupted without receiving a security code for authorization;
   sending an unauthorized interruption notification signal to the power transmitter after detecting that the wireless charging is interrupted without receiving the security code for authorization; and
   starting a protection function if the wireless charging is detected to be interrupted without receiving the security code for authorization.

5. The power receiver of claim 4, wherein the protection function comprises at least one of releasing a warning signal to notify an owner of a power receiver theft, launching a function for reporting a location of the power receiver, and sending a message to a specific person or a place for help.

6. The power receiver of claim 4, wherein the power transmitter releases a warning signal to notify an owner of a power receiver theft or sends a message to a specific person or a place for help after receiving the unauthorized interruption notification signal.

* * * * *